United States Patent
Bellows et al.

(10) Patent No.: US 10,269,159 B2
(45) Date of Patent: Apr. 23, 2019

(54) NEURAL NETWORK FOREGROUND SEPARATION FOR MIXED REALITY

(71) Applicant: Rockwell Collins, Inc., Cedar Rapids, IA (US)

(72) Inventors: Peter R. Bellows, Marion, IA (US); Danilo P. Groppa, Orlando, FL (US)

( * ) Notice: Subject to any disclaimer, the term of this patent is extended or adjusted under 35 U.S.C. 154(b) by 0 days.

(21) Appl. No.: 15/661,964

(22) Filed: Jul. 27, 2017

(65) Prior Publication Data
US 2019/0035125 A1  Jan. 31, 2019

(51) Int. Cl.
| | |
|---|---|
| G06T 1/20 | (2006.01) |
| G06T 7/194 | (2017.01) |
| G06T 11/60 | (2006.01) |
| G06T 19/00 | (2011.01) |
| G02B 27/01 | (2006.01) |
| G06F 3/01 | (2006.01) |
| G06K 9/00 | (2006.01) |
| G06K 9/62 | (2006.01) |
| G02B 27/00 | (2006.01) |

(52) U.S. Cl.
CPC .............. *G06T 11/60* (2013.01); *G02B 27/00* (2013.01); *G02B 27/01* (2013.01); *G02B 27/017* (2013.01); *G06F 3/011* (2013.01); *G06K 9/00664* (2013.01); *G06K 9/00671* (2013.01); *G06K 9/6254* (2013.01); *G06K 9/6274* (2013.01); *G06K 9/6284* (2013.01); *G06T 7/194* (2017.01); *G06T 19/006* (2013.01); *G06F 3/012* (2013.01); *G06F 3/013* (2013.01); *G06T 2207/20081* (2013.01); *G06T 2210/12* (2013.01)

(58) Field of Classification Search
CPC ........ H06N 3/08; H06N 3/0445; H06N 3/049; G06T 19/006; G06T 7/11; G06T 7/194; G06T 2207/20084; G02B 27/017; G02B 27/01

USPC ..................................................... 345/633, 8
See application file for complete search history.

(56) References Cited

U.S. PATENT DOCUMENTS 9,792,501 B1 * 10/2017 Maheriya ............. H04N 13/246
9,965,789 B2 * 5/2018 Anderson .......... G06Q 30/0625
(Continued)

OTHER PUBLICATIONS

Bruder, Gerd et al., "Enhancing Presence in Head-Mounted Display Environments by Visual Body Feedback Using Head-Mounted Cameras", Cyberworlds, 2009, CW'09, International Conference on, IEEE, Piscataway, NJ, USA, Sep. 7, 2009, pp. 43-50.
(Continued)

*Primary Examiner* — Jin Cheng Wang
(74) *Attorney, Agent, or Firm* — Angel N. Gerdzhikov; Donna P. Suchy; Daniel M. Barbieri

(57) ABSTRACT

A head wearable device, a method, and a system. The head wearable device may include a display, a camera, a convolutional neural network (CNN) processor, and a processor. The CNN processor may be configured to: receive real scene image data from the camera; identify and classify objects in a real scene image; and generate object classification and position data. The processor may be configured to receive the real scene image data; receive the object classification and position data from the CNN processor; perform an image segmentation operation on the real scene image to fill in the objects; generate filled-in object data indicative of filled-in objects; generate a pixel mask; receive virtual scene image data; create mixed reality scene image data; and output the mixed reality scene image data to the display for presentation to a user.

18 Claims, 14 Drawing Sheets

(56) References Cited

U.S. PATENT DOCUMENTS

| | | | | |
|---|---|---|---|---|
| 2016/0035139 A1* | 2/2016 | Fuchs | ............ | G02B 27/017 345/633 |
| 2016/0148429 A1 | 5/2016 | Groppa et al. | | |
| 2016/0378861 A1* | 12/2016 | Eledath | ............ | G06K 9/00718 707/766 |
| 2017/0148222 A1* | 5/2017 | Holzer | ............ | H04N 13/243 |
| 2017/0148223 A1* | 5/2017 | Holzer | ............ | G06F 17/30837 |
| 2017/0323481 A1* | 11/2017 | Tran | ............ | G06T 19/006 |
| 2018/0158197 A1* | 6/2018 | Dasgupta | ............ | H04N 13/243 |
| 2018/0189567 A1* | 7/2018 | Maheriya | ............ | G06T 7/536 |
| 2018/0260665 A1* | 9/2018 | Zhang | ............ | G06K 9/6276 |
| 2018/0268256 A1* | 9/2018 | Di Febbo | ............ | G06K 9/6256 |
| 2018/0300556 A1* | 10/2018 | Varerkar | ............ | G06K 9/00771 |

OTHER PUBLICATIONS

McGill, Mark et al., "A dose of Reality", Human Factors in Computing Systems, ACM, 2 Penn Plaza, Suite 701, New York NY 10121-0701 USA, Apr. 18, 2015, pp. 2143-2152.

Extended European Search Report dated Nov. 23, 2018 for EP Application No. 18184700.5.

Ujjawalkarn, An Intuitive Explanation of Convolutional Neural Networks—the data Science Blog, https://ujjwalkarn.me/2016/08/11/intuitive-explanation-convnets/, Posted Aug. 11, 2016, 29 pages.

Tim Conneally, A New Player in Self-Driving Cars, Wealth Daily, http://www.wealthdaily.com/articles/a-new-player-in-self-driving-cars/7522, Posted Mar. 18, 2015, 6 pages.

Rockwell Collins, Coalescence™ mixed reality system, https://www.rockwellcollins.com/Products_and_Services/Defense/Simulation_and_Training/Training_Systems/Coalescence.aspx, Printed online Jun. 5, 2017, 5 pages.

Rockwell Collins, Coalescence™ mixed reality system, https://www.rockwellcollins.com/Products_and_Services/Defense/Simulation_and_Training/Training_Systems/Coalescence.aspx, Downloaded from website: Jun. 15, 2017, 2 pages.

Wikipedia, Convolutional neural network, https://en.wikipedia.org/wiki/Convolutional_neural_network, Jun. 13, 2017, 13 pages.

Wikipedia, Virtual reality headset, https://en.wikipedia.org/wiki/Virtual_reality_headset, Jun. 25, 2017, 6 pages.

* cited by examiner

NEURAL NETWORK FOREGROUND SEPARATION FOR MIXED REALITY

BACKGROUND

Virtual reality (VR) allows simulation and training providers to deliver rich and immersive virtual content. Mixed reality blends virtual scenes and real scenes into a single three-dimensional immersive scene. Mixed reality generally utilizes a method of real-time video processing, extracting foreground imagery from background, and generating a blended scene to a user display, which combines desired real-world foreground objects with a virtual background. Mixed reality user training enhances VR by engaging user muscle memory and providing tactile feedback, which are critical components of learning. Mixed reality allows a trainee to handle real equipment, which the trainee would use in the field, and allows for multi-user training scenarios where teammates can see each other in the same three-dimensional virtual environment.

Mixed reality systems require foreground separation. Foreground separation involves identifying which real objects in a user's field of view are to be included in a mixed reality scene and identifying which real objects are to be hidden by a virtual environment. Ideally, foreground separation should be performed in a real-time, frame-by-frame basis and with an absolute minimum of latency in order to preserve the real-time, immersive feel of the blended environment. Currently implemented foreground separation methods, however, have serious drawbacks, which limit the quality of the mixed reality experience. For example, chroma keying (often referred to as "greenscreen" substitution), which is often used with weather news and in computer-generated imagery (CGI) movies, is a fast and efficient algorithm that uses a specified color to identify all of the background. Chroma keying is cumbersome to work with, however, because chroma keying requires a fixed site, which requires, for example, significant setup time, precise lighting to ensure uniform background color, and regular cleaning. Additionally, chroma keying fails to support the easy deployment goals of the "train anywhere" Department of Defense (DoD) initiative. Other currently implemented foreground separation methods utilize depth-sensing technology; however, depth-sensing technology lacks the resolution and low latency requirements to support real-time mixed reality processing. Currently implemented foreground separation methods that utilize depth-sensing technology cannot be used with mixed reality systems to achieve desired levels of realism, such as 4K video resolution at 90 frames per second (FPS). Additionally, infrared-based depth sensing technology is highly dependent on scene lighting and materials used because infrared-based depth sensing is based on reflection of infrared light back to a sensor. As such, some foreground objects, which may not reflect infrared light well, tend to get dropped from the scene.

Further, stereoscopic vision foreground separation methods, which utilize two-dimensional convolutions of left eye versus right eye images to find common features, are very compute-intensive such that the stereoscopic vision foreground separation methods cannot keep pace with specified frame rates.

SUMMARY

In one aspect, embodiments of the inventive concepts disclosed herein are directed to a head wearable device. The head wearable device may include a display, a camera, a convolutional neural network (CNN) processor, and a processor. The camera may be configured to capture a real scene image. The CNN processor may be communicatively coupled to the camera. The CNN processor may be configured to: receive real scene image data corresponding to the captured real scene image from the camera; identify objects in the real scene image; classify each object of the identified objects as a foreground object or a background object; generate object classification and position data indicative of classifications and positions of the identified objects; and output the object classification and position data. The processor may be communicatively coupled to the camera, the CNN processor, and the display. The processor may be configured to: receive the real scene image data corresponding to the captured real scene image from the camera; receive the object classification and position data from the CNN processor; based on position data of the object classification and position data, perform an image segmentation operation on the real scene image to fill in the objects; generate filled-in object data indicative of the filled-in objects; based on the object classification and position data and the filled-in object data, generate a pixel mask corresponding to foreground objects; receive virtual scene image data corresponding to a virtual scene image; based on the pixel mask, blend the virtual scene image and the real scene image to create a mixed reality scene image as mixed reality scene image data; and output the mixed reality scene image data to the display for presentation to a user.

In a further aspect, embodiments of the inventive concepts disclosed herein are directed to a method. The method may include receiving, by a convolutional neural network (CNN) processor, real scene image data corresponding to a real scene image from a camera. The method may further include identifying, by the CNN processor, objects in the real scene image. The method may further include classifying, by the CNN processor, each object of the identified objects as a foreground object or a background object. The method may further include generating, by the CNN processor, object classification and position data indicative of classifications and positions of the identified objects. The method may further include outputting, by the CNN processor, the object classification and position data. The method may further include receiving, by a processor, the real scene image data corresponding to the real scene image from the camera. The method may further include receiving, by the processor, the object classification and position data from the at least one CNN processor. The method may further include, based on position data of the object classification and position data, performing, by the processor, an image segmentation operation on the real scene image to fill in the objects. The method may further include generating, by the processor, filled-in object data indicative of the filled-in objects. The method may further include, based at least on the object classification and position data and the filled-in object data, generating, by the processor, a pixel mask corresponding to foreground objects. The method may further include receiving, by the processor, virtual scene image data corresponding to a virtual scene image. The method may further include, based on the pixel mask, blending, by the processor, the virtual scene image and the real scene image to create a mixed reality scene image as mixed reality scene image data. The method may further include outputting, by the processor, the mixed reality scene image data to a display for presentation to a user.

In a further aspect, embodiments of the inventive concepts disclosed herein are directed to a system. The system may include a display, a camera, a convolutional neural network (CNN) processor, and a processor. The camera may be configured to capture a real scene image. The CNN processor may be communicatively coupled to the camera. The CNN processor may be configured to: receive real scene image data corresponding to the captured real scene image from the camera; identify objects in the real scene image; classify each object of the identified objects as a foreground object or a background object; generate object classification and position data indicative of classifications and positions of the identified objects; and output the object classification and position data. The processor may be communicatively coupled to the camera, the CNN processor, and the display. The processor may be configured to: receive the real scene image data corresponding to the captured real scene image from the camera; receive the object classification and position data from the CNN processor; based on position data of the object classification and position data, perform an image segmentation operation on the real scene image to fill in the objects; generate filled-in object data indicative of the filled-in objects; based on the object classification and position data and the filled-in object data, generate a pixel mask corresponding to foreground objects; receive virtual scene image data corresponding to a virtual scene image; based on the pixel mask, blend the virtual scene image and the real scene image to create a mixed reality scene image as mixed reality scene image data; and output the mixed reality scene image data to the display for presentation to a user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
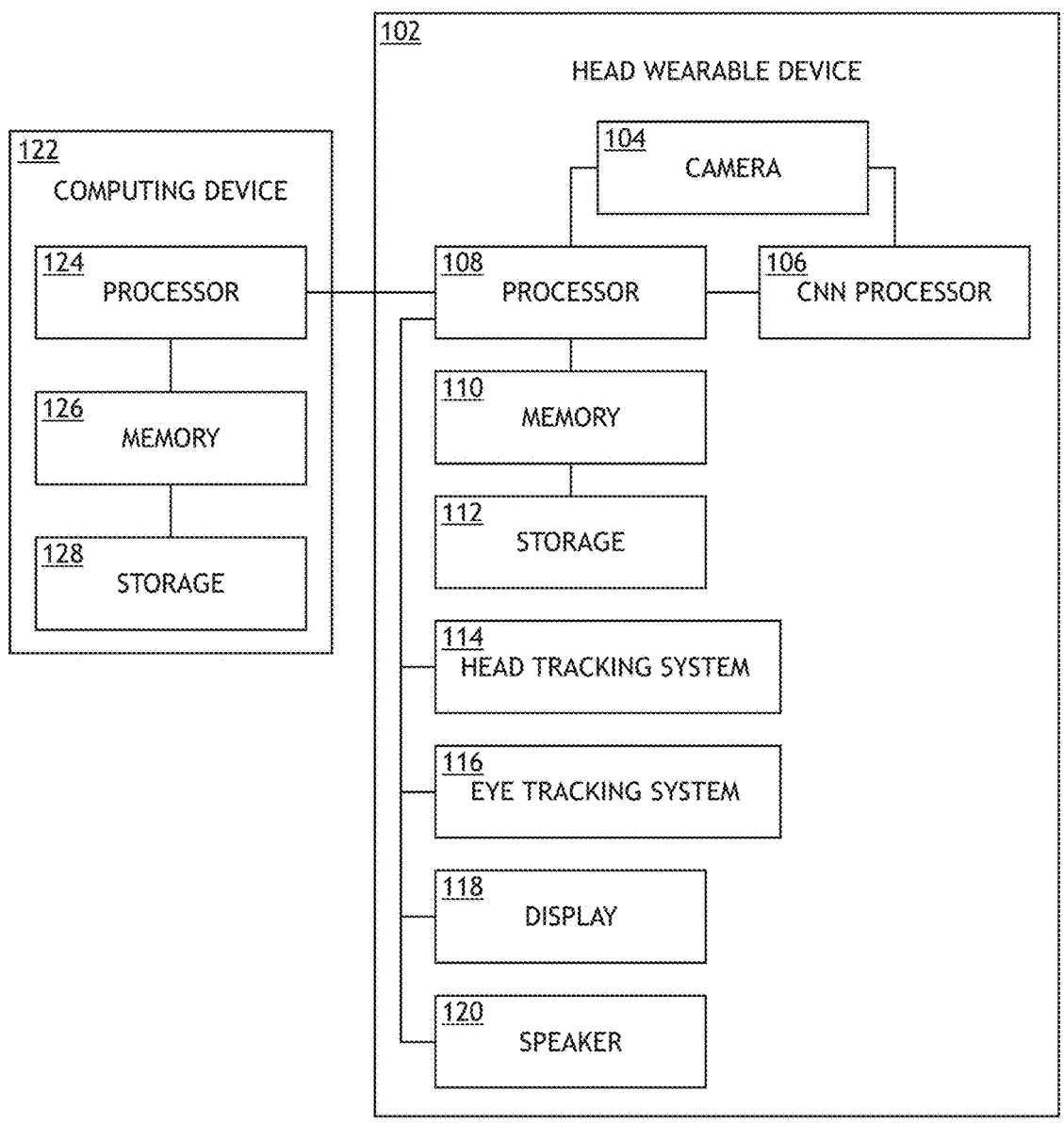
FIG. 1 is a view of an exemplary embodiment of a system including a head wearable device and a computing device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and at least one device configured to perform foreground separation by using at least one neural network, such as a convolutional neural network (CNN). CNNs are a type of artificial intelligence and deep learning. Some embodiments are configured to perform customized training of the neural network to identify unique features of a specific training environment so as to improve accuracy in performing foreground separation. Additionally, some embodiments are configured to perform live correction and/or live retraining so that such embodiments can learn from errors in foreground separation based on live feedback from human users; such correction and/or retraining iteratively improves the quality of foreground separation. In some embodiments, the neural network does not create a full pixel mask required for the foreground separation, but rather, the neural network identifies objects, classifies the objects, provides bounding boxes for the objects, and provides positions of the objects. The neural network information may be fused with optical cues from the video stream (e.g. detected edges) to generate the full pixel mask, which may be used to complete foreground separation. For example, the neural network (e.g., a CNN) may be efficiently implemented in any suitable processor, such as a field programmable gate array (FPGA) or graphics processing unit (GPU), which may be implemented on a small single-board, man-portable system to support untethered and mobile mixed reality training.

Some embodiments utilize deep learning CNNs to perform real-time foreground separation for mixed reality systems. Mixed reality systems, which utilize CNNs to perform real-time foreground separation, are an improvement over greenscreen-based systems with equivalent performance because such mixed reality systems eliminate the need for cumbersome setup, lighting, and maintenance of greenscreen labs. Mixed reality systems, which utilize CNNs to perform real-time foreground separation, have significant competitive advantages due to such systems' ease of deployment in new training environments and due to the breadth of personnel training applications for which such systems may be used. Embodiments, which utilize CNNs to perform real-time foreground separation, may have an order-of-magnitude advantage in total video bandwidth, as computed by resolution multiplied by frame rate, as compared to currently implemented mixed reality systems, which utilize depth-sensing systems. Because CNNs are based on simple two-dimensional convolutions of small kernels, which can be arranged in a straightforward pipeline for throughput, CNNs can process high-resolution video at line rates.

A convolutional neural network is a computational structure modeled after the human brain. CNNs are often used for pattern recognition and artificial intelligence applications. Pattern recognition is based on two-dimensional convolutions of small feature templates, whose outputs are then passed to several successive layers of further convolution to identify key structures and relationships among the detected features. This approach is often referred to as "deep learning" due to the highly-layered nature of the convolutions. Nodes (also known as neurons) in a CNN are highly interconnected so as to help model and recognize structural features of input data, such as shapes, colors, and textures. Each connection may have a programmable weight that may be applied to characterize the relationships of the relative features. Convolution steps are interspersed with "pooling", which involves subsampling for spatial invariance to reduce the dataset. The convolution steps may be concluded with a fully-connected classifier network that accumulates the results and that statistically predicts the classification of the object(s) based on feature matches.

CNNs are capable of recognizing a wide variety of objects in new environments due to repetitive training of what "similar-to" objects look like. Most CNN systems require training. Proper training typically requires many iterations with an extensive "known-answer" dataset. CNN training involves "backpropagation", where prediction errors in training are measured with a "loss function", which helps to identify the source of the prediction error in the CNN. This loss function is then used to modify the weights in the CNN to improve the prediction result for a next iteration. As such, neurons in the CNN are self-adapting to model key patterns in the input space. CNN training is a relatively compute-intensive process, but CNN training generally only needs to be performed once for a given application. Once CNN training is complete, the system can be optimized for the calculated set of weights to minimize resources and maximize performance.

Referring now to FIG. 1, an exemplary embodiment of a system according to the inventive concepts disclosed herein includes at least one head wearable device 102 and at least one computing device 122, some or all of which may be communicatively coupled at any given time. For example, the head wearable device 102 may be configured to receive virtual images (e.g., virtual scene images) from the computing device 122 and configured to provide a wearer of the head wearable device 102 with a mixed reality experience by blending the virtual images with real images (e.g., real scene images) to create combined three-dimensional immersive scene images, which are presented to the wearer of the head wearable device 102.

The head wearable device 102 may be configured to present mixed reality scene images to the wearer of the head wearable device 102. The head wearable device 102 may include at least one camera 104, at least one CNN processor 106, at least one processor 108, at least one memory 110, at least one storage device 112, a head tracking system 114, an eye tracking system 116, at least one display 118, and at least one speaker 120, some or all of which may be communicatively coupled.

The camera 104 may be configured to capture real images (e.g., real scene images) of a wearing user's field of view. The camera 104's field of view may align with a wearing user's field of view. The camera 104 may be configured to output the real images as real image data (e.g., real scene image data) to the CNN processor 106 and the processor 108. The camera 104 may be configured to output a stream of real images as a stream of real image data to the CNN processor 106 and the processor 108. In some embodiments, the camera 104 may be implemented as a plurality of cameras.

A CNN may be implemented as or in the CNN processor 106. The CNN processor 106 may be implemented as any suitable processor, such as an FPGA or a GPU. As part of system installation, the CNN may be trained to recognize the environment in which it is installed as background, whereas human participants and any props to be used in the mixed reality environment may be tagged as foreground. Once the CNN processor 106 is trained, the CNN processor 106 may be configured to receive the real images as real image data from the camera 104. The CNN processor 106 may be configured to perform a portion of a foreground separation process for each real image. For each real image, by utilizing the CNN, the CNN processor 106 may be configured to identify objects of the real image, classify the objects of the real image, provide bounding boxes for the objects, and provide positions (e.g., as defined by an object's center) of the objects, and the CNN processor 106 may be configured to generate and output object classification and position data indicative of identified objects' classification and positions. For example, for each real image, the CNN processor 106 may be configured to classify a particular object of the real image as being a foreground object or a background object. For each real image, the CNN processor 106 may be configured to output the object classification and position data to a processor (e.g., the processor 108) for use in creating a pixel mask. The CNN processor 106 may be configured to run various software applications or computer code stored in a non-transitory computer-readable medium and configured to execute various instructions or operations. The CNN processor 106 may be implemented as a special purpose processor configured to execute instructions for performing any or all of the operations disclosed throughout.

The processor 108 may be implemented as any suitable processor, such as a general purpose processor, an image processor, and/or an FPGA. The processor 108 may be configured to receive the real images as real image data from the camera 104. The processor 108 may be configured to perform portions of the foreground separation process for each real image. For each real image, the processor 108 may be configured to perform at least one image segmentation operation, such as an edge detection operation and/or a connected component labelling operation. Additionally, for each real image, the processor 108 may be configured to receive the object classification and position data from the CNN processor 106. Further, for each real image, the processor 108 may be configured to perform an object fusion operation by creating a pixel mask. Also, for each real image, the processor 108 may be configured to receive a virtual image from the computing device 122. For each real image and each corresponding virtual image, based at least on the pixel mask, the processor 108 may be configured to blend the real image and the virtual image to create a mixed reality image. The processor 108 may be configured to output a stream of mixed reality images as mixed reality image data to the display 118 for presentation to a wearing user of the head wearable device 102.

In some embodiments, the at least one processor 108 may be implemented as a plurality of processors, such as at least one general purpose processor and at least one image processor. The processor 108 may be configured to run various software applications or computer code stored in a non-transitory computer-readable medium and configured to execute various instructions or operations. The processor 108 may be implemented as a special purpose processor configured to execute instructions for performing any or all of the operations disclosed throughout.

Figure 3:
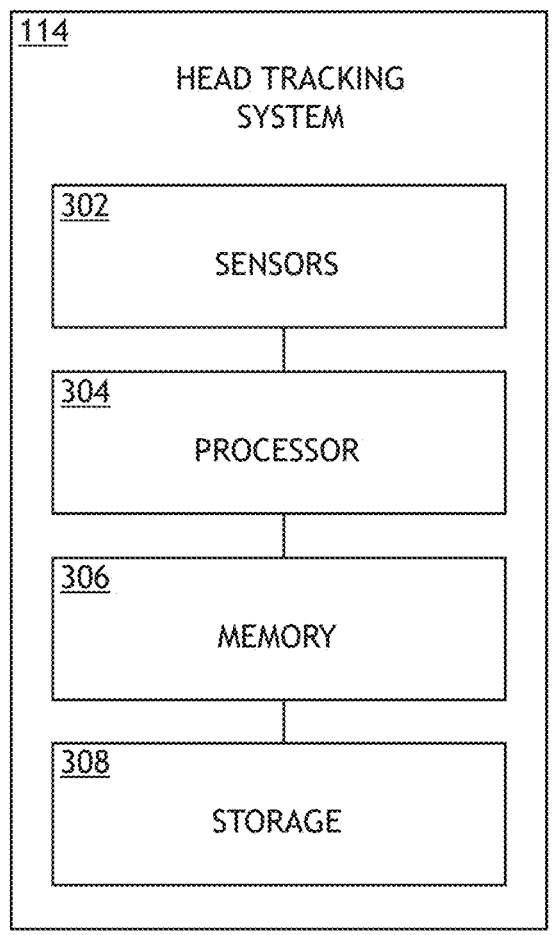
FIG. 3 is a view of the head tracking system of the head wearable device of FIG. 1 according to the inventive concepts disclosed herein.

The head tracking system 114 may be configured to determine and track a position and an orientation of a user's head relative to an environment, such as a training environment. The head tracking system 114 may be configured for performing fully automatic head tracking operations in real time. The head tracking system 114 may include sensors 302, a processor 304, memory 306, and storage 308, as shown in FIG. 3, as well as other components, equipment, and/or devices commonly included in a head tracking system. The sensors 302, the processor 304, the memory 306, and the storage 308, as well as the other components, equipment, and/or devices commonly included in a head tracking system may be communicatively coupled.

The processor 304 of the head tracking system 114 may be configured to process data received from the sensors 302 and output processed data to the computing device 122 and/or the processor 108. For example, the processor 304 may be configured to determine and track a position and orientation of a user's head relative to a training environment. Additionally, for example, the processor 304 may be configured to generate position and orientation data associated with such determined information and output the generated position and orientation data to the computing device 122 and/or the processor 108. The processor 304 of the head tracking system 114 may be configured to run various software applications or computer code stored in a non-transitory computer-readable medium and configured to execute various instructions or operations. The processor 304 may be implemented as a special purpose processor configured to execute instructions for performing any or all of the operations disclosed throughout.

Figure 2:
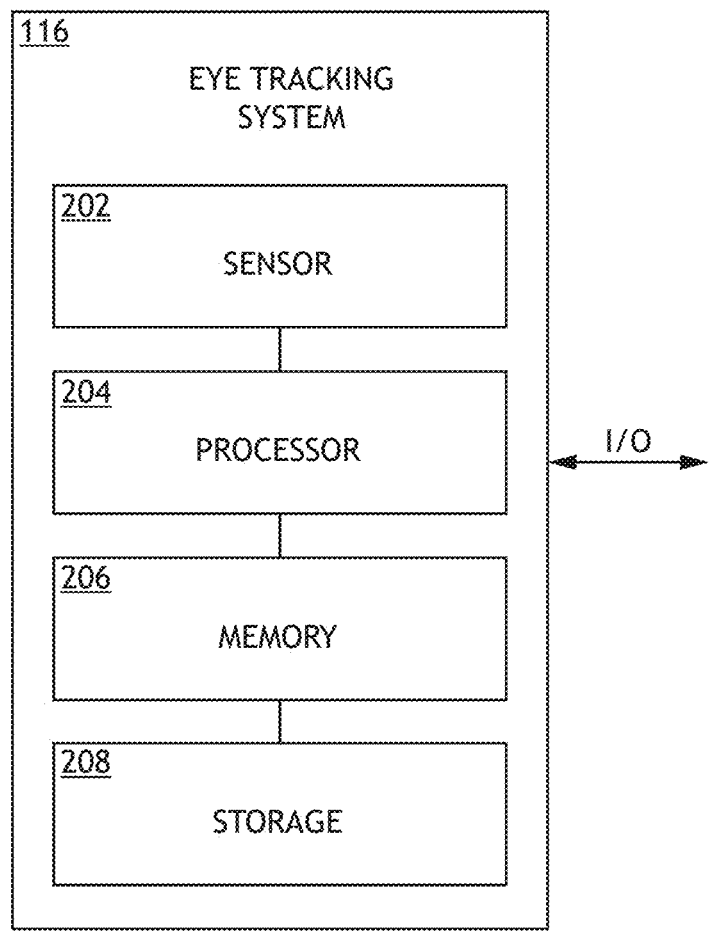
FIG. 2 is a view of the eye tracking system of the head wearable device of FIG. 1 according to the inventive concepts disclosed herein.

The eye tracking system 116 may be configured to track eye gestures, track movement of a user's eye, track a user's gaze, determine a location of a vergence point (sometimes referred to as a point of regard) of a user's gaze, determine eye locations, determine an intra-pupillary distance (IPD) between a user's eyes, determine a direction between a determined location of a user's eye and a determined location of a vergence point for each of a user's eyes, and/or otherwise receive inputs from a user's eyes. The eye tracking system 116 may be configured for performing fully automatic eye tracking operations of users in real time. The eye tracking system 116 may include at least one sensor 202, at least one processor 204, memory 206, and storage 208, as shown in FIG. 2, as well as other components, equipment, and/or devices commonly included in an eye tracking system. The sensor 202, the processor 204, the memory 206, and the storage 208, as well as the other components, equipment, and/or devices commonly included in an eye tracking system may be communicatively coupled.

The processor 204 of the eye tracking system 116 may be configured to process data received from the sensor 202 and output processed data to the processor 108 and/or the computing device 122. For example, the processor 204 may be configured to determine a location of a vergence point of a user's gaze, determine eye locations, determine an intra-pupillary distance (IPD) between a user's eyes, and/or determine a direction between a determined location of a user's eye and a determined location of a vergence point for each of a user's eyes. Additionally, for example, the processor 204 may be configured to generate data associated with such determined information and output the generated data to the processor 108 and/or the computing device 122. The processor 204 of the eye tracking system 116 may be configured to run various software applications or computer code stored in a non-transitory computer-readable medium and configured to execute various instructions or operations. The processor 204 may be implemented as a special purpose processor configured to execute instructions for performing any or all of the operations disclosed throughout.

The display 118 may be configured to receive a stream of mixed reality images as a stream of mixed reality image data and present the stream of mixed reality images to a wearing user of the head wearable device 102. The display 118 may be implemented as any suitable display, such as a see-through display (e.g., Microsoft Hololens) or an occluded display (e.g., Oculus Rift). Additionally, while the display 118 is depicted as a single display, the display 118 may be implemented as a plurality of displays, such as one display for each eye of a user.

The speaker 120 may be configured to receive audio content associated with a mixed reality environment and to present the audio content as audio to a wearing user of the head wearable device 102. Additionally, while the speaker 120 is depicted as a single speaker, the speaker 120 may be implemented as a plurality of speakers, such as one speaker for each ear of a user.

While the camera 104, the CNN processor 106, the processor 108, the memory 110, the storage device 112, the head tracking system 114, the eye tracking system 116, the display 118, and the speaker 120 of the head wearable device 102 have been exemplarily depicted as being implemented as separate devices or subsystems, in some embodiments, some or all of the camera 104, the CNN processor 106, the processor 108, the memory 110, the storage device 112, the head tracking system 114, the eye tracking system 116, the display 118, and/or the speaker 120 may be implemented as a single integrated system or device or as any number of integrated and/or partially integrated subsystems and/or devices.

While the head wearable device 102 exemplarily includes elements as shown, in some embodiments, one or more of the elements of the head wearable device 102 may be omitted, or the head wearable device 102 may include other elements.

The computing device 122 may include at least one processor 124, at least one memory 126, and at least one storage device 128, as well as other components, equipment, and/or devices commonly included in a computing device, some or all of which may be communicatively coupled. The processor 124 may be implemented as any suitable processor, such as a general purpose processor, an FPGA, and/or an image processor. For example, the computing device 122 may be configured to receive position and orientation data (e.g., a stream of position and orientation data) from the head wearable device 102, wherein the position and orientation data is indicative of a position and orientation of the user's head. For example, the computing device 122 may be configured to receive position and orientation data from the head tracking system 114 of the head wearable device 102. Based at least on the position and orientation data, the processor 124 may be configured to generate a virtual image (e.g., a virtual scene image) corresponding to a field of view of the wearer of the head wearable device 102. The processor may be configured to output the virtual image as virtual image data to the head wearable device 102. The processor 124 may be configured to generate a stream of virtual images and output the stream of virtual images as a stream of virtual image data to the head wearable device 102. The processor 124 may be configured to run various software applications or computer code stored (e.g., maintained) in a non-transitory computer-readable medium and configured to execute various instructions or operations. Additionally, for example, the computing device 122 or the processor 124 may be implemented as special purpose computers or special purpose processors configured (e.g., programmed) to execute instructions for performing any or all of the operations disclosed throughout. In some embodiments, the system of FIG. 1 may include any suitable number of computing devices 122, such as a plurality.

While the computing device 122 exemplarily includes elements as shown, in some embodiments, one or more of the elements of the computing device 122 may be omitted, or the computing device 122 may include other elements.

While the head wearable device 102 and the computing device 122 have been exemplarily depicted as being implemented as separate devices or systems, in some embodiments, some or all of the head wearable device 102 and the computing device 122 may be implemented as a single integrated system or device or as any number of integrated and/or partially integrated systems and/or devices.

While FIG. 1 exemplarily includes elements as shown, in some embodiments, one or more of the elements of the system may be omitted, or the system may include other elements. Additionally, while an embodiment has been depicted as including one head wearable device 102 and one computing device 122, other embodiments may include any number of head wearable devices 102 of various types and computing devices 122 of various types positioned or moving anywhere in the system.

Referring now to FIG. 2, the eye tracking system 116 of the head wearable device 102 of FIG. 1 is shown according to the inventive concepts disclosed herein.

Referring now to FIG. 3, the head tracking system 114 of the head wearable device 102 of FIG. 1 is shown according to the inventive concepts disclosed herein.

Referring now to FIGS. 4A-H, an exemplary embodiment of an image processing pipeline and associated images according to the inventive concepts disclosed herein is depicted.

Figure 4A:
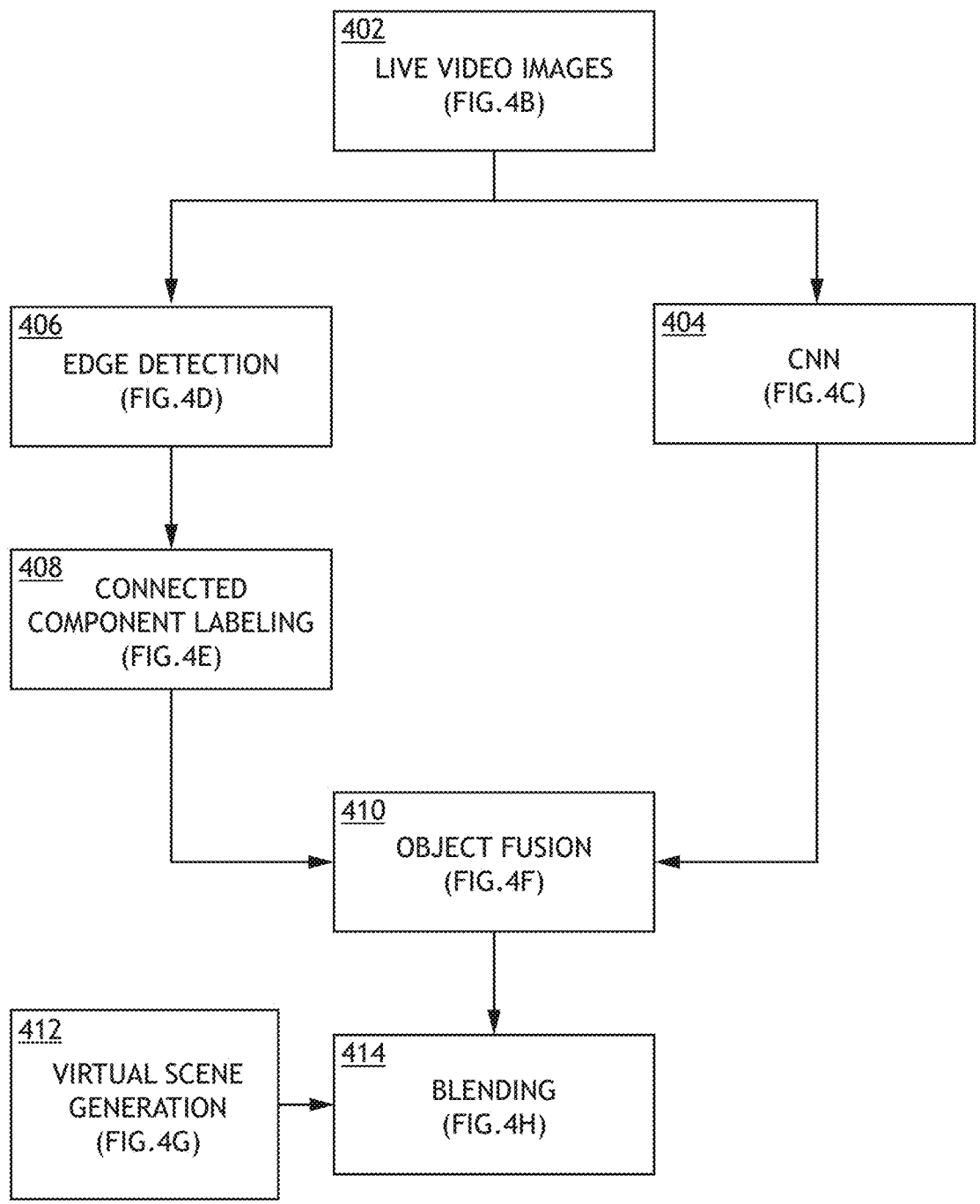
FIG. 4A is a view of an exemplary embodiment of an image processing pipeline according to the inventive concepts disclosed herein.

Referring now to FIG. 4A, an exemplary embodiment of an image processing pipeline according to the inventive concepts disclosed herein is depicted. The image processing pipeline may be implemented as or on the CNN processor 106 and the processor 108. The image processing pipeline may be configured to pre-process live real scene image data from the camera 104 and to prepare the live real scene image data for blending with virtual scene image data. The image processing pipeline may include steps of receiving live video images 402, CNN 404, edge detection 406, connected component labeling 408, object fusion 410, and blending 414. A foreground separation process may comprise the steps of the CNN 404, the edge detection 406, the connected component labeling 408, and the object fusion 410. By utilizing a CNN, the foreground separation process may be configured to identify and classify each object of the real scene in real-time as foreground (meaning the object should appear in the blended scene image data) or background (meaning the object should be hidden behind the virtual scene image data). The foreground separation process utilizes a combination of CNN operations (e.g., CNN step 404) and image segmentation operations (e.g., edge detection step 406 and/or connected component labeling step 408).

Figure 4B:
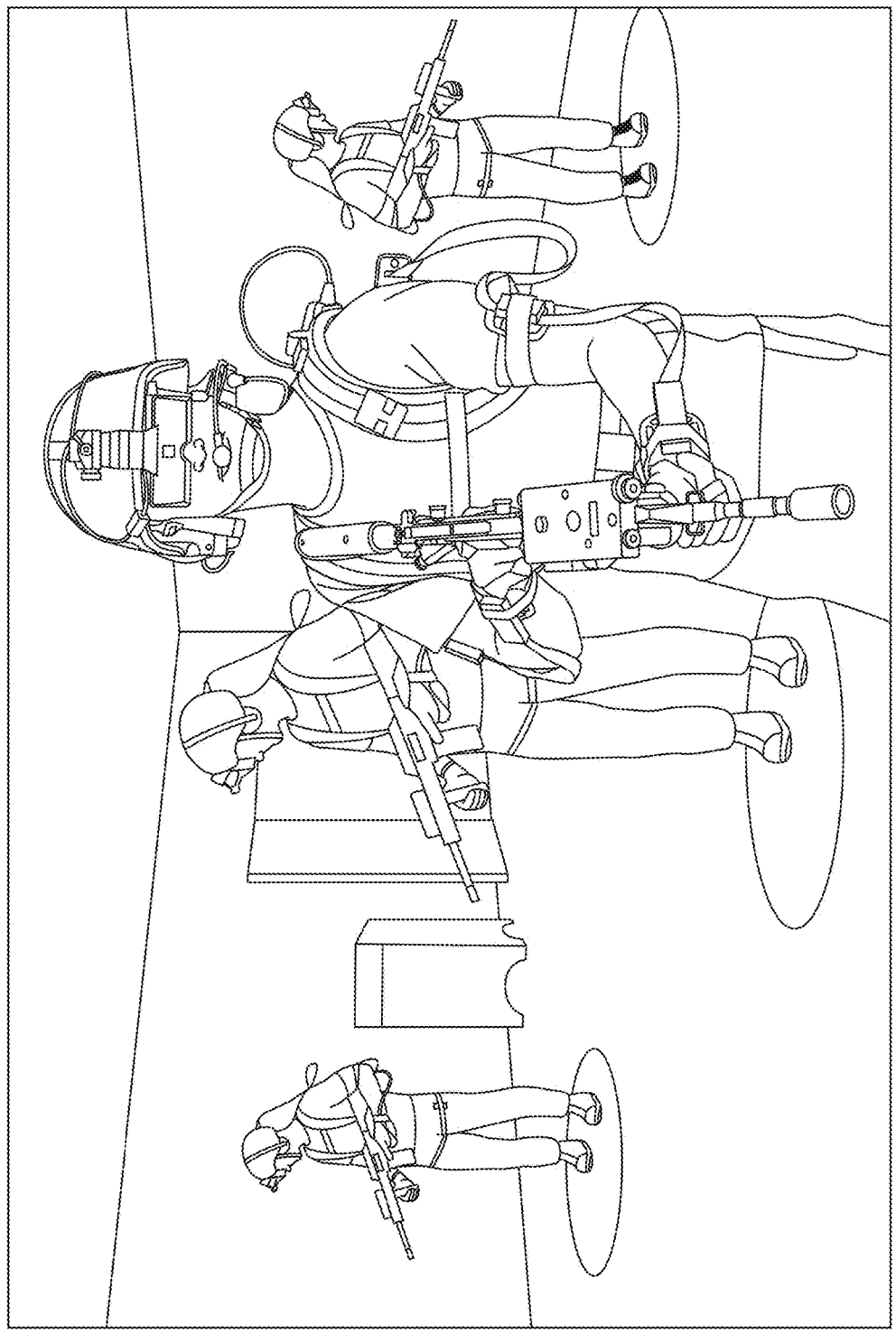
FIG. 4B shows an exemplary real scene image according to the inventive concepts disclosed herein.

A step of receiving live video images 402 may include each of the CNN processor 106 and the processor 108 receiving a same real scene image as real scene image data from the camera 104. FIG. 4B shows an exemplary real scene image according to the inventive concepts disclosed herein. The image processing pipeline may include two parallel branches which can be performed concurrently. For example, the CNN step 404 may be performed by the CNN processor 106 concurrently to performance of the steps of the edge detection 406 and the connected component labeling 408.

Figure 4C:
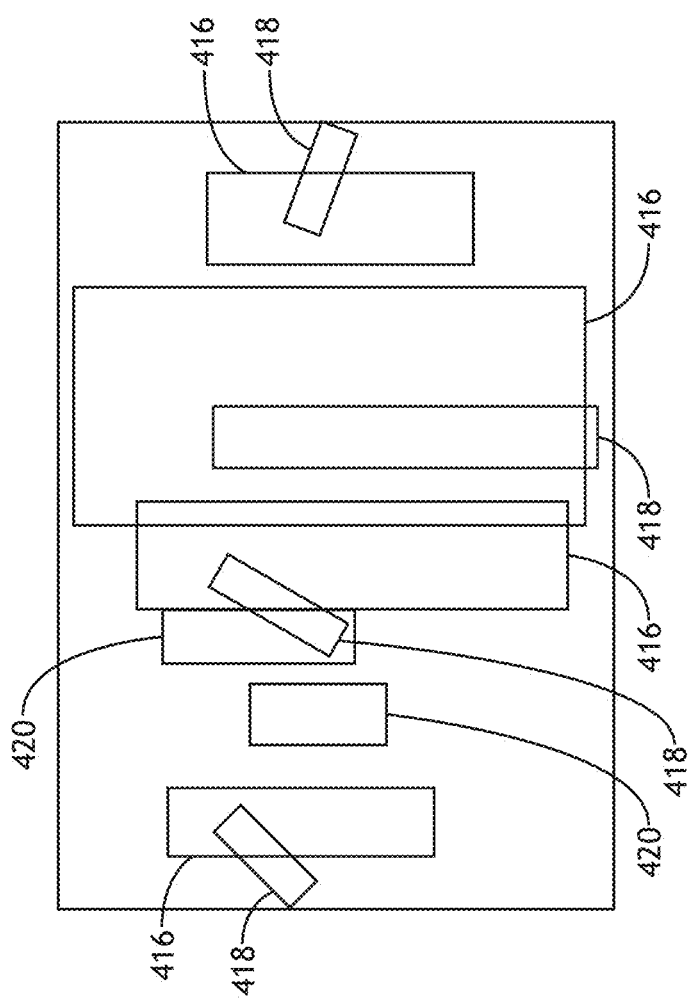
FIG. 4C shows an exemplary processed real scene image with bounding boxes and positions associated with classified objects according to the inventive concepts disclosed herein.

The CNN step 404 may be performed by the CNN processor 106. The CNN processor 106 may be configured to perform a portion of a foreground separation process for each real scene image. For each real scene image, the CNN processor 106 may be configured to identify objects of the real image, classify the objects of the real image, provide bounding boxes for the objects, and provide positions (e.g., as defined by an object's center) of the objects. The CNN processor 106 may be configured to generate and output object classification and position data indicative of identified objects' classification and positions. For example, FIG. 4C shows an exemplary processed real scene image with bounding boxes and positions associated with classified objects according to the inventive concepts disclosed herein. For example, as shown in FIG. 4, the CNN processor 106 may be configured to identify objects (e.g., 416, 418, and 420). For example, the CNN processor 106 may be configured to classify personnel as foreground objects 416, classify props (e.g., guns) as foreground objects 418, and classify a podium and a doorway as background objects 420. Each of the foreground objects 416, 418 and the background objects 420 may have a bounding box and a position (e.g., a center of the object). In some embodiments, the CNN processor 106 utilizes only two classifications: foreground objects and background objects. For each real image, the CNN processor 106 may be configured to output the object classification and position data to a processor (e.g., the processor 108) for use in creating a pixel mask of the object fusion step 410.

Figure 4D:
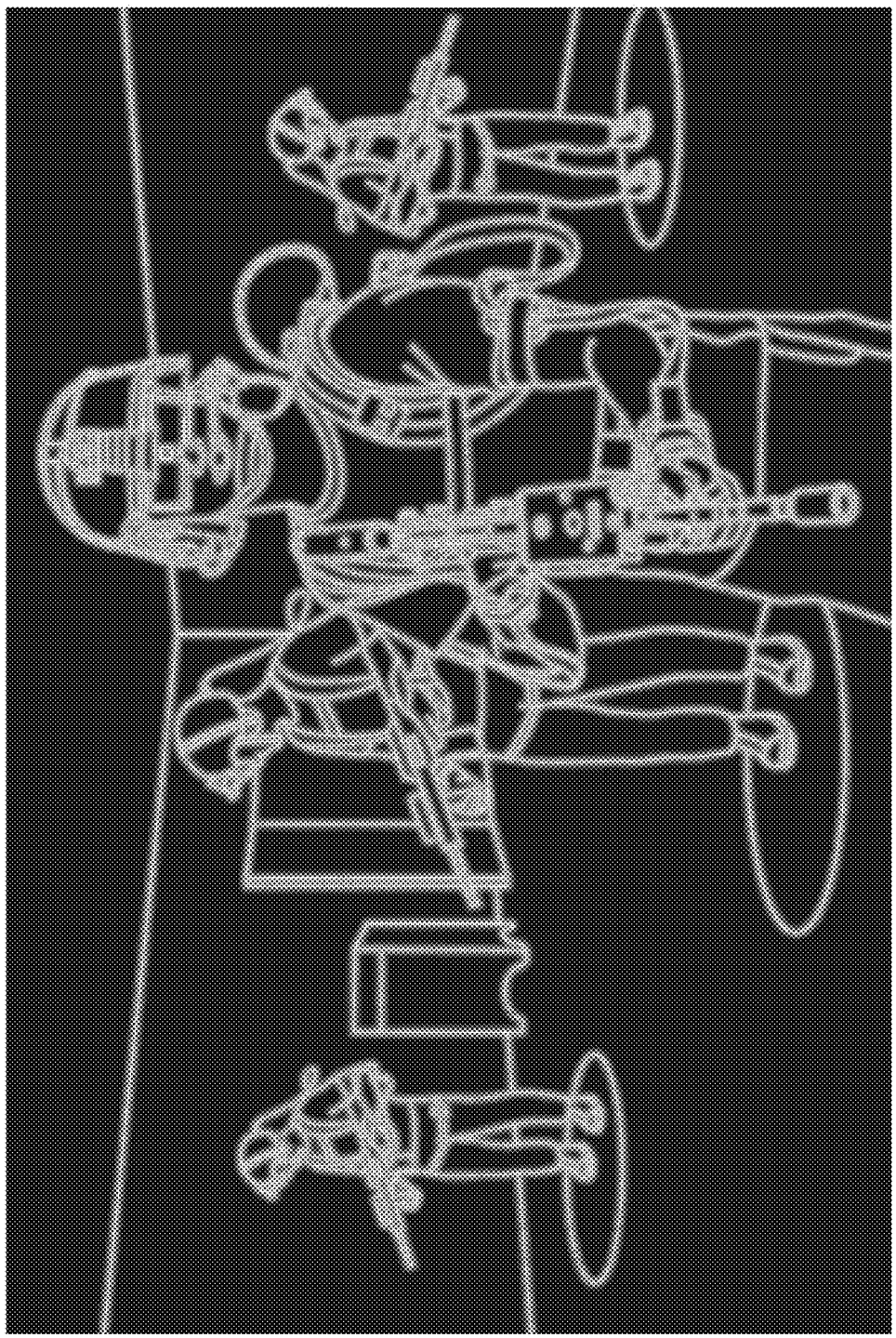
FIG. 4D shows an exemplary processed real scene image with detected edges of objects according to the inventive concepts disclosed herein.

The edge detection step 406 may be performed by the processor 108. The edge detection step 406 may include detecting edges of objects for each real scene image. For example, detecting edges of objects may include identifying outlines of the objects. For example, FIG. 4D shows an exemplary processed real scene image with detected edges of objects according to the inventive concepts disclosed herein. The edge detection step 406 may include the processor 108 generating detected edge data indicative of the detected edges of the objects.

Figure 4E:
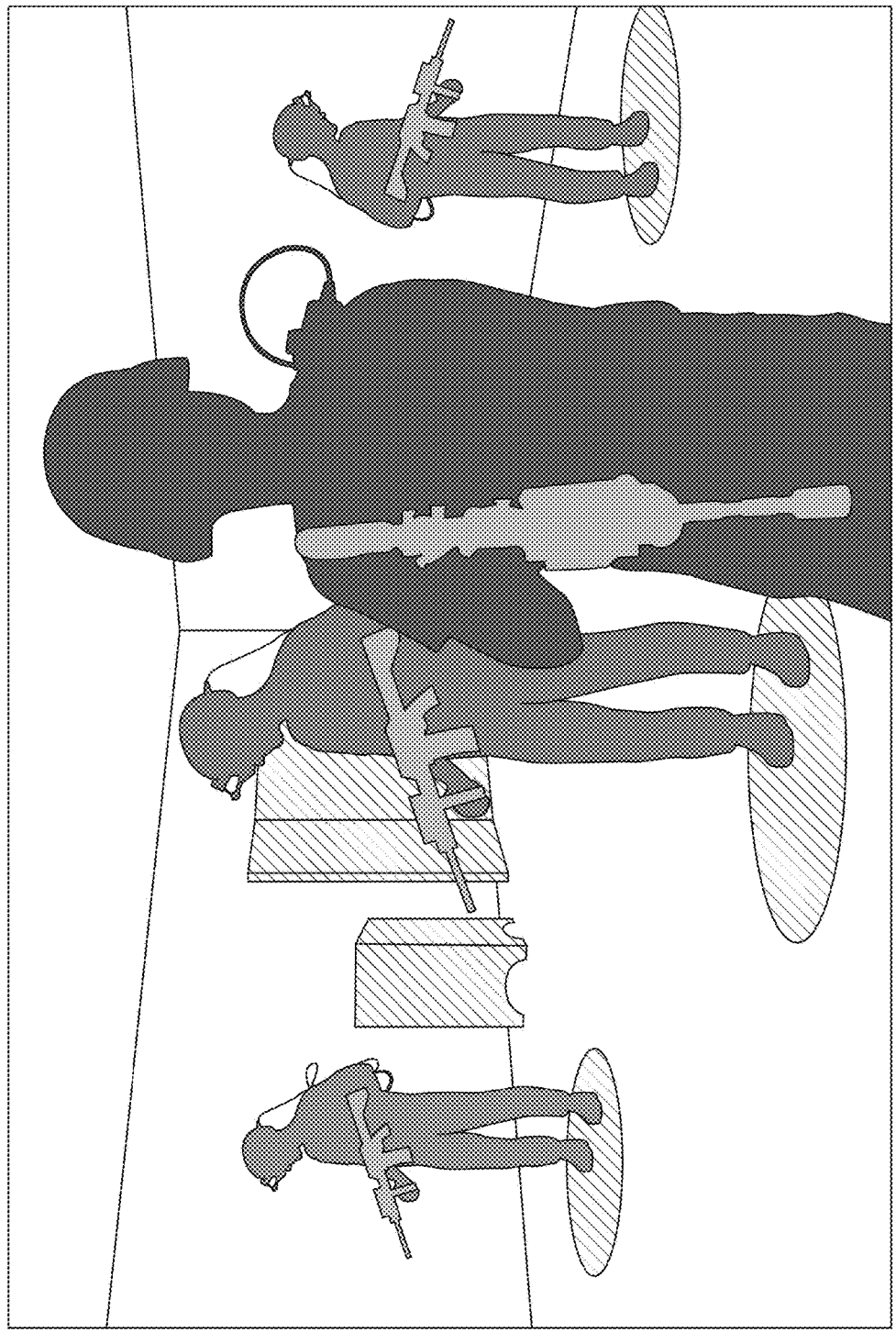
FIG. 4E shows an exemplary processed real scene image with filled-in objects according to the inventive concepts disclosed herein.

The connected component labeling step 408 may be performed by the processor 108. The connected component labeling step 408 may include utilizing the detected edge data generated in the edge detection step 406. Based at least on the detected edge data, the processor 108 may fill in the objects. For example, FIG. 4E shows an exemplary processed real scene image with filled-in objects according to the inventive concepts disclosed herein. The connected component labeling step 408 may include the processor 108 generating filled-in object data indicative of the filled-in objects.

Figure 4F:
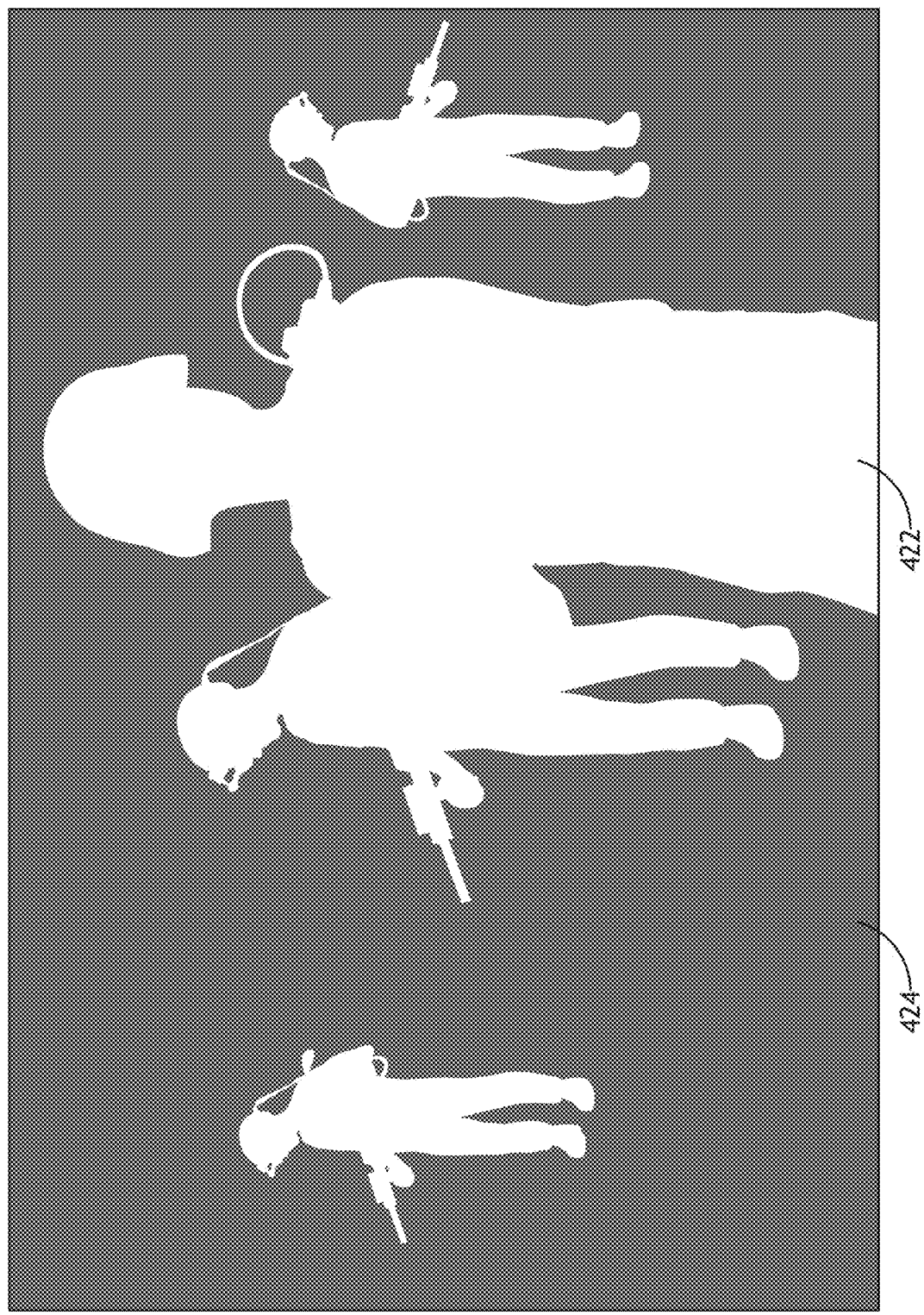
FIG. 4F shows an exemplary processed real scene image as a blending value pixel mask according to the inventive concepts disclosed herein.

The object fusion step 410 may be performed by the processor 108. The object fusion step 410 may include utilizing the filled-in object data and the object classification and position data. For each pixel, the processor 108 may generate a blending value based at least on the filled-in object data and the object classification and position data. Each blending value may control a ratio of a virtual scene pixel to a real scene pixel for use in the blending step 414. By generating a blending value for each pixel, the processor 108 may generate a pixel mask (e.g., a blending value pixel mask). For example, the processor 108 may fuse the filled-in object data and the object classification and position data to create a blending value pixel mask. For example, filled-in objects which correlate to foreground-classified objects by the CNN may be included in the mask, while filled-in objects which correlate to background-classified objects may be omitted from the pixel mask. For example, FIG. 4F shows an exemplary processed real scene image as a blending value pixel mask according to the inventive concepts disclosed herein. The blending value pixel mask may include foreground pixel areas 422 and background pixel areas 424. The object fusion step 410 may include the processor 108 generating pixel mask data indicative of the blending value pixel mask.

Figure 4G:
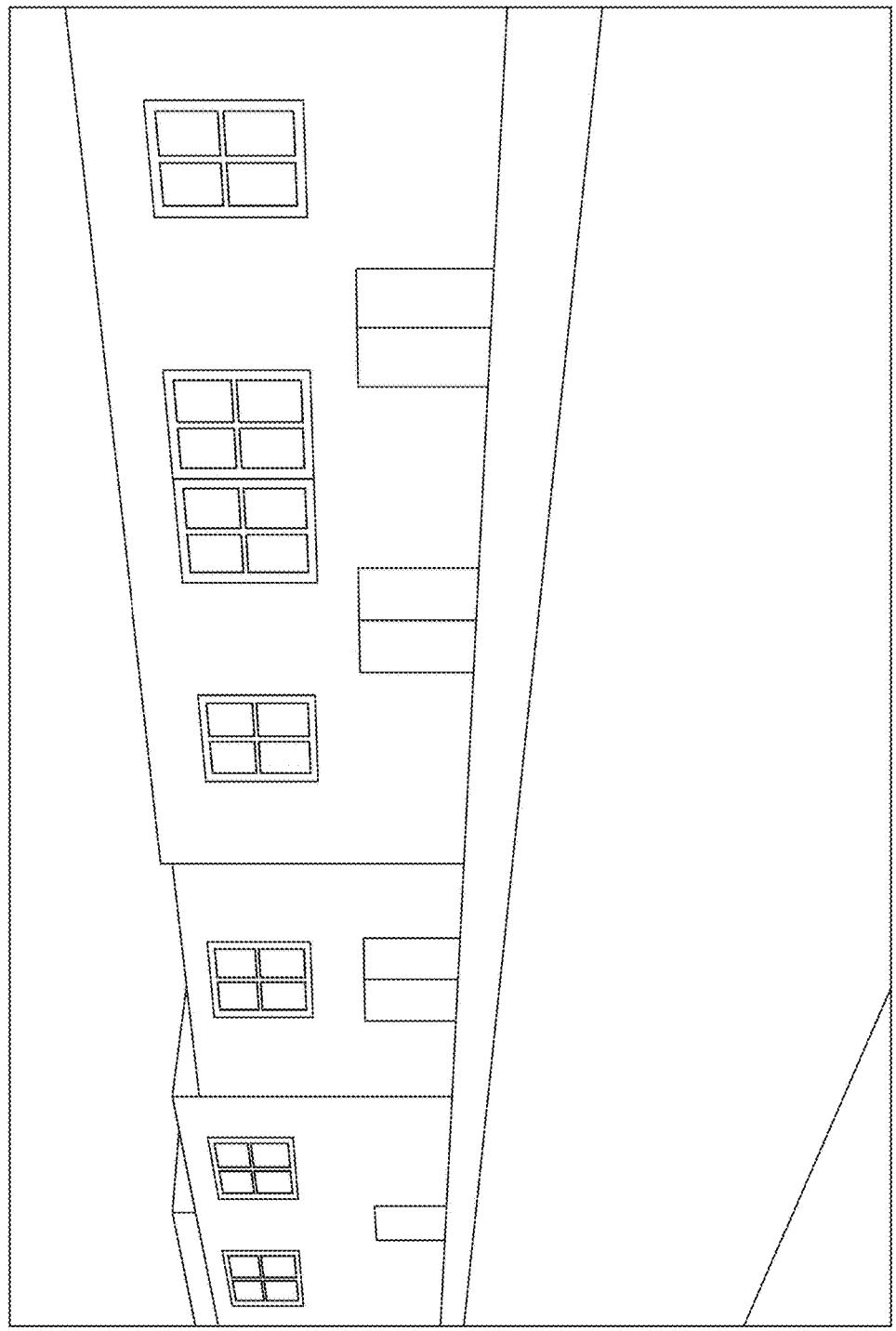
FIG. 4G shows an exemplary virtual scene image according to the inventive concepts disclosed herein.

A virtual scene generation step 412 may, for example, be performed by the processor 124. For example, based at least on the position and orientation data from the head tracking system 114 of the head wearable device 102, the processor 124 may be configured to generate a virtual scene image corresponding to a field of view of the wearer of the head wearable device 102. For example, FIG. 4G shows an exemplary virtual scene image according to the inventive concepts disclosed herein. The processor 124 may be configured to output the virtual scene image as virtual scene image data to the processor 108 and/or head wearable device 102.

Figure 4H:
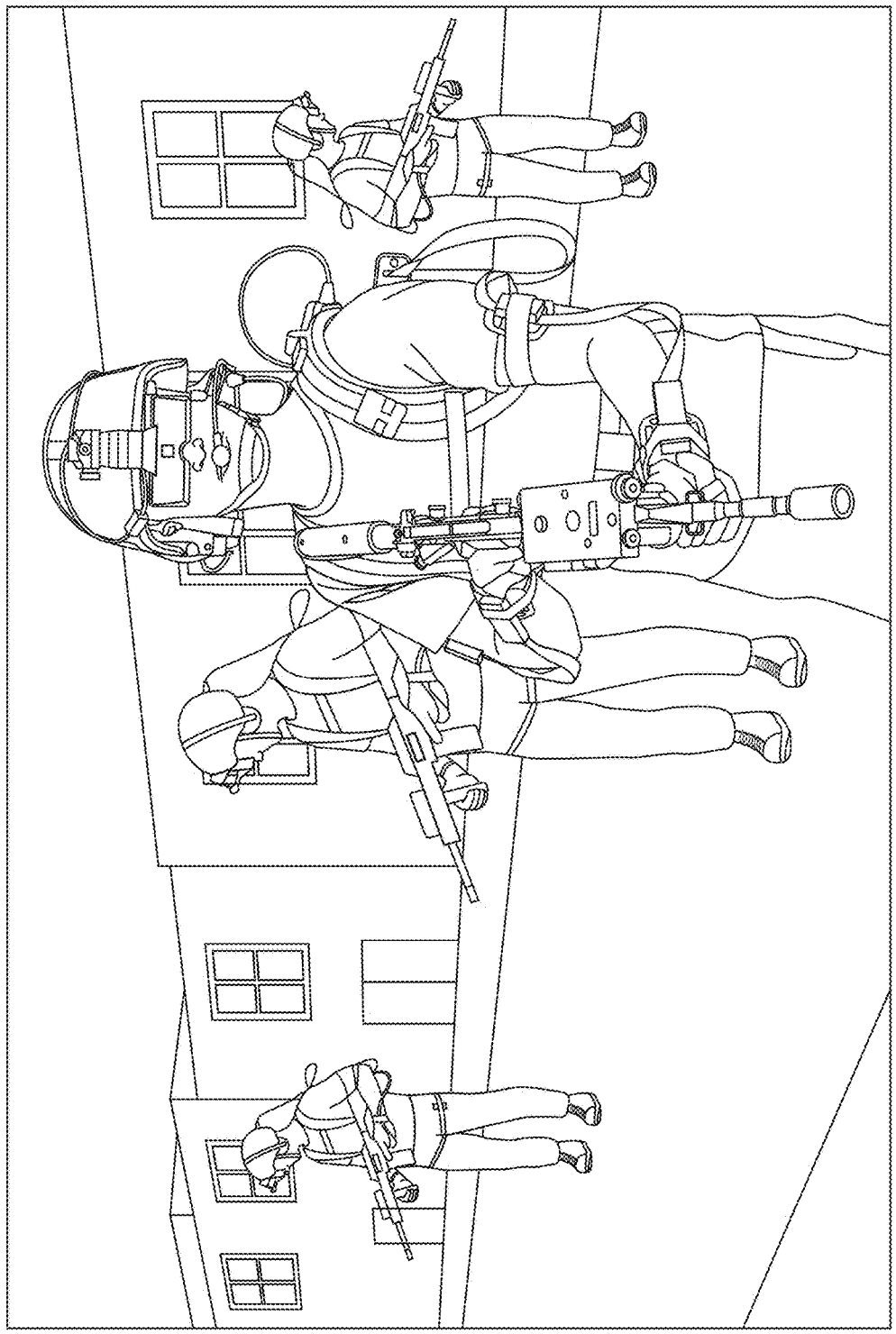
FIG. 4H shows an exemplary mixed reality scene image according to the inventive concepts disclosed herein.

The blending step 414 may be performed by the processor 108. The blending step 414 may include blending the virtual scene image and the real scene image based at least on the blending value pixel mask. For example, the processor 108 may utilize the blending value pixel mask with a blender function to generate a mixed reality scene image. The blending step 414 may be compatible with see-through displays, such as the Microsoft HoloLens, and occluded displays, such as the Oculus Rift. For example, with respect to a see-through display, the processor 108 may utilize the blending value pixel mask to extract background pixels from the virtual scene image and overlay background pixels onto the see-through display while "fitting around" the real foreground objects already visible through the see-through display. For example, with respect to an occluded display, the processor 108 may utilize the blending value pixel mask to extract foreground pixels from the real scene image and overlay the extracted foreground pixels on top of the virtual scene image. For example, FIG. 4H shows an exemplary mixed reality scene image according to the inventive concepts disclosed herein. The processor 108 may be configured to output a stream of mixed reality scene images to the display 104.

Embodiments may be configured to have a high accuracy rate of classification and a high accuracy rate of shape detection in order to promote an immersive mixed reality experience.

In some embodiments, environmental factors can be leveraged to improve accuracy. For example, based on the position and orientation data from the head tracking system 114 and/or eye tracking data from the eye tracking system 116, the processor 108 may adjust system behavior. For example, multiple sets of CNN weights may be stored in a non-transitory computer readable medium (e.g., memory 110 and/or the storage device 112), and the processor may be configured to dynamically switch from a first set of CNN weights to a second set of CNN weights when the wearing user is determined to be facing a particular portion (e.g., a zone) of an environment. For example, dynamically switching between sets of CNN weights may be used to adjust accuracy for when the wearing user is looking into dark corners or other portions of the environment that may ordinarily cause the CNN processor 106 to output inaccurate results when using the default CNN weights. Additionally, the CNN may be tuned to integrate visual cues over one or more previous frames to recognize motion. For example, the CNN processor 106 may classify moving objects as foreground objects. As few as one or two previous frames could be used to identify the occurrence of motion.

Embodiments may have a low video processing latency, such as less than 20 milliseconds (ms), which is generally considered imperceptible to humans. Embodiments may be configured to achieve a low video processing latency at least in part because the image processing pipeline of the head wearable device 102 can perform object classification (e.g., CNN step 404) and shape extraction (e.g., steps 406 and 408) in parallel. For example, the image processing pipeline may have a latency of one frame for a head wearable device 102 displaying mixed reality images at 90 frames per second, and when latency of the image processing pipeline is combined with other sources of latency (e.g., camera exposure time, display delay, and/or transport delay), the total system latency may be less than or equal to 20 milliseconds.

Some embodiments include one or more additional operations to further reduce latency. For example, the system may use a rolling shutter in the cameras to eliminate transport delay from the total latency. Additionally, the output I/O rate from the camera 104 and image processing pipeline clock may be increased to reduce the processing time for each frame. In some embodiments, the system could be tuned to work with sub-frames, where each image is divided into horizontal stripes which are each treated as an independent image. Based on visual cues in the controlled user environment, the CNN processor 106 may accurately classify background objects and foreground objects despite the sub-frames. Since each sub-frame is analogous to a unit of storage and computation, the latency of the image processing pipeline may be reduced proportionally to the sub-frame size.

Additionally, because the CNN functions and the object labeling functions utilize two-dimensional array operations such as convolution, which are well-suited to hardware pipelining, the CNN functions and the object labeling functions can operate at the full pixel rate of the system, regardless of input resolution used; as such, embodiments have a distinct advantage in image resolution over depth-sensing approaches to foreground separation, which currently can only support significantly lower resolutions.

Figure 5:
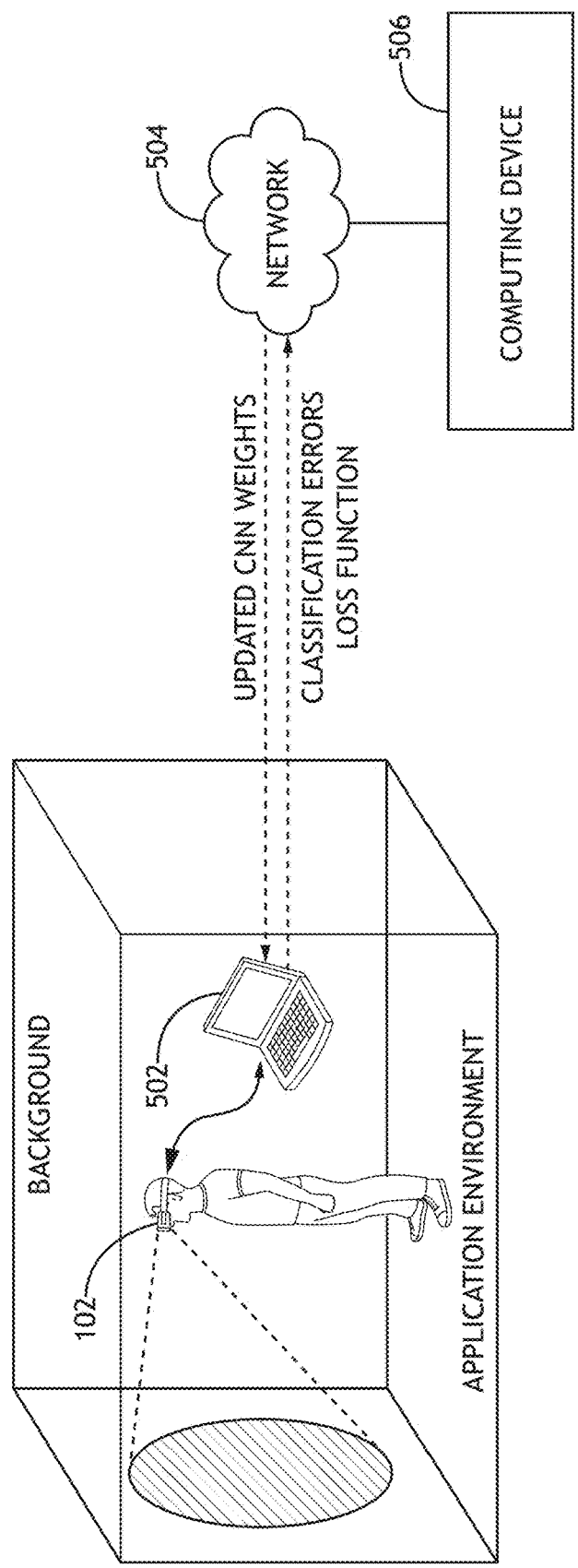
FIG. 5 is a view of an exemplary embodiment of a system including the head wearable device of FIG. 1, computing devices, and a network according to the inventive concepts disclosed herein is depicted.

Referring now to FIG. 5, an exemplary embodiment of a system including the head wearable device 102, a computing device 502, a network 504, and a computing device 506 according to the inventive concepts disclosed herein is depicted. Some or all of the head wearable device 102, the computing device 502, the network 504, and the computing device 506 may be communicatively coupled. Each of the computing devices 502, 506 may include at least one processor, memory, and storage, which may be implemented and function similarly as the processor 124, the memory 126, and the storage 128, respectively, of the computing device 122 shown and described with respect to FIG. 1.

CNN training is important to system accuracy. Because CNN training is generally computationally intensive and time intensive and because full CNN training occurs infrequently (e.g., as little as once, for a given application environment), some of the CNN training processes may be offloaded to communicatively coupled computing devices (e.g., 502 and/or 506). For example, during CNN training, the head wearable device 102 may be communicatively coupled to the computing device 502 (e.g., a mobile computing device, such as a laptop computing device) and the computing device 506 (e.g., a server computing device). One or more of the computing devices 502, 506 may be configured to compute the loss function and back-propagation of errors in CNN training to generate updated CNN weights. Offloading such functions may allow the head wearable device 102 to have minimal size, weight, and power requirements. For example, a technician may initiate a CNN training routine by scanning (e.g., with the camera 104 of the head wearable device 102) the application environment, where the head wearable device 102 will be used, for background objects and then gradually introducing foreground objects, such as props and people. The technician may monitor the CNN processor 106's classification results and classification errors as they are outputted to the computing device 506. The computing device 506 may iteratively calculate CNN weights and provide updated CNN weights to the computing device 502 and the head wearable device 102. Once the CNN training has yielded a desired level of accuracy, the calculated CNN weights may be stored in a non-transitory computer readable medium (e.g., memory 110 and/or storage device 112) in the head wearable device 102.

Figure 6:
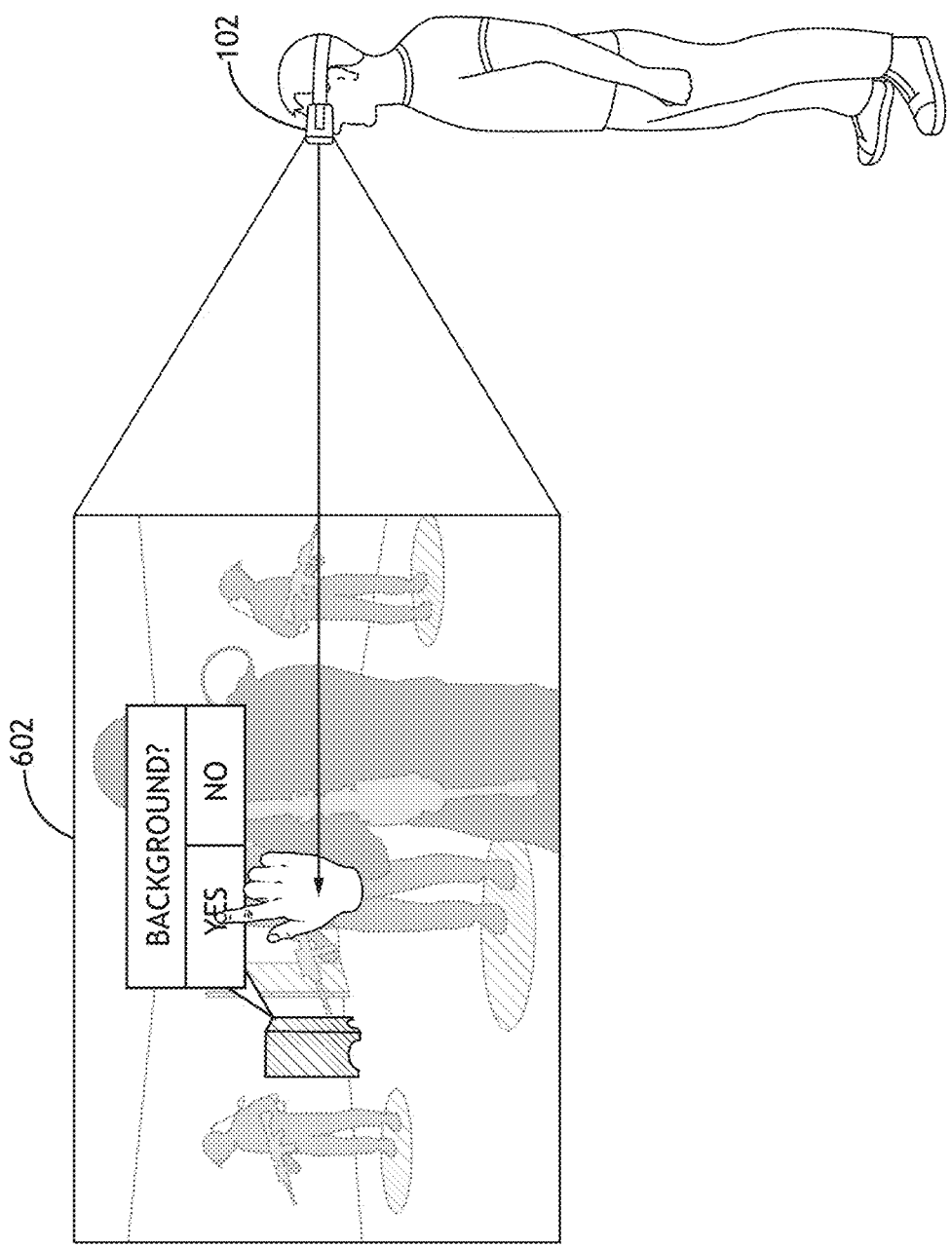
FIG. 6 is a view of an exemplary embodiment of the head wearable device of FIG. 1 displaying an object classification screen in a CNN manual training mode according to the inventive concepts disclosed herein.

Referring now to FIG. 6, an exemplary embodiment of head wearable device 102 displaying an object classification screen 602 while operating in a CNN manual training mode according to the inventive concepts disclosed herein is depicted. While operating in the CNN manual training mode, the display 104 displays an object classification screen 602 rather than a normal mixed reality image. In the CNN manual training mode, a user of the head wearable device 102 may be able to manually classify objects as foreground objects or background objects. For example, the display 104 may be configured to display the object classification screen 602, which allows the user to manually classify objects as foreground objects or background objects. Some embodiments may utilize the position and orientation data from the head tracking system 114 and/or eye tracking data from the eye tracking system 116 to allow the user to interface with the object classification screen 602, while in the CNN manual training mode.

The object classification screen 602 includes a segmented real scene view (e.g., corresponding to the filled-in objects of the connected component labeling step 408) of the application environment. The object classification screen 602 includes a cursor that may be controlled, for example, by the position and orientation data from the head tracking system 114 and/or eye tracking data from the eye tracking system 116. For example, the user may select a particular filled-in object by looking at the filled-in object and pressing a button on the head wearable device 102. Once a filled-in object has been selected, the display 104 may display a dialog box, which prompts the user to classify the selected filled-in object as background or foreground. For example, the user may classify the object as foreground or background by looking at the "foreground" box or the "background" box and pressing a button on the head wearable device 102. This manual object classification information may be provided to the backpropagation network and utilized to refine the CNN weights. This manual training capability may also be used to provide real-time corrections to the CNN weights, post-installation. For example, if during a mixed reality session, the user notices that object classification errors are occurring, the user could press a button to enter a CNN manual training mode, gesture to indicate where the error occurred, correctly reclassify the object(s), and then resume the mixed reality session. A snapshot of source imagery (e.g., real scene, object classification view, and erroneous mixed reality scene) associated with the classification error may be stored in a non-transitory computer readable medium (e.g., memory 110 and/or storage device 112) as a classification error report for post-analysis. When the system is idle, a technician could review any pending classification error reports, process the reports, and potentially update the CNN weights. In some embodiments, the classification error reports may be output to the computing device 502 and/or over the network 504 to computing device 506 and be resolved remotely from the head wearable device 102. In some embodiments, the CNN manual training mode may be used to log corrections. Additionally, the CNN manual training mode may be used for initial CNN training and on-going CNN refinement.

Figure 7:
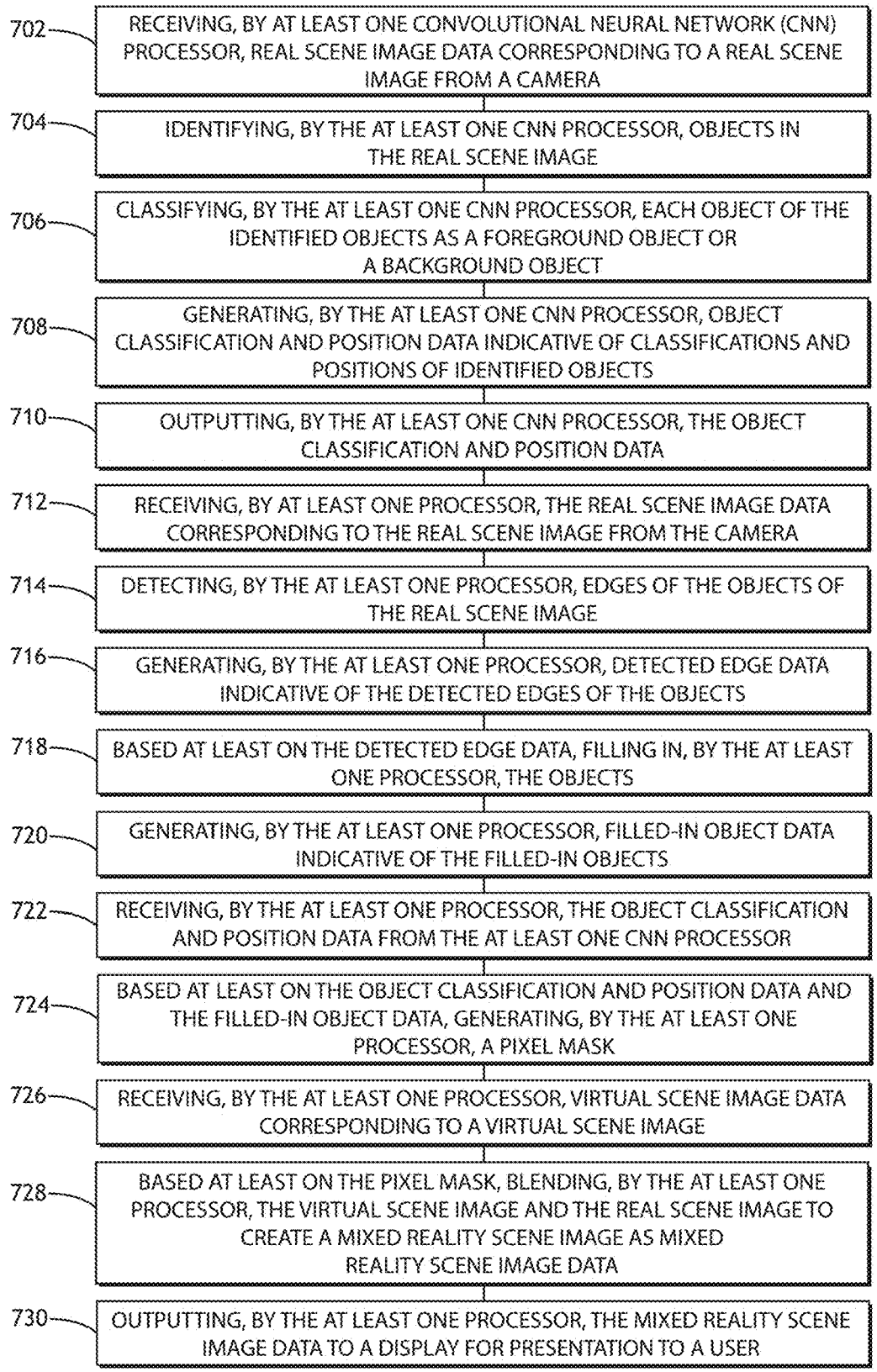
FIG. 7 is a diagram of an exemplary embodiment of a method according to the inventive concepts disclosed herein.

Referring now to FIG. 7, an exemplary embodiment of a method according to the inventive concepts disclosed herein may include one or more of the following steps. Additionally, for example, some embodiments may include performing one more instances of the method iteratively, concurrently, and/or sequentially. Additionally, for example, at least some of the steps of the method may be performed in parallel and/or concurrently. Additionally, in some embodiments, at least some of the steps of the method may be performed non-sequentially.

A step 702 may include receiving, by at least one convolutional neural network (CNN) processor, real scene image data corresponding to a real scene image from a camera.

A step 704 may include identifying, by the at least one CNN processor, objects (e.g., unique objects) in the real scene image.

A step 706 may include classifying, by the at least one CNN processor, each object of the identified objects as a foreground object or a background object.

A step 708 may include generating, by the at least one CNN processor, object classification and position data indicative of classifications and positions of identified objects.

A step 710 may include outputting, by the at least one CNN processor, the object classification and position data.

A step 712 may include receiving, by at least one processor, the real scene image data corresponding to the real scene image from the camera.

In some embodiments, the method may include performing at least one image segmentation operation on the real scene image. For example, in some embodiments, the method may include, based at least on position data of the object classification and position data, performing at least one image segmentation operation on the real scene image to fill in the objects. For example, performing at least one image segmentation operation may include any or all of steps 714, 716, 718, and/or 720.

The step 714 may include detecting, by the at least one processor, edges of the objects of the real scene image. In some embodiments, the step 714 may include, based at least on position data of the object classification and position data, detecting, by the at least one processor, edges of the objects of the real scene image.

The step 716 may include generating, by the at least one processor, detected edge data indicative of the detected edges of the objects.

The step 718 may include, based at least on the detected edge data, filling in, by the at least one processor, the objects. In some embodiments, the step 718 may include, based at least on the detected edge data and the position data of the object classification and position data, filling in, by the at least one processor, the objects.

The step 720 may include generating, by the at least one processor, filled-in object data indicative of the filled-in objects.

A step 722 may include receiving, by the at least one processor, the object classification and position data from the at least one CNN processor.

A step 724 may include, based at least on the object classification and position data and the filled-in object data, generating, by the at least one processor, a pixel mask corresponding to foreground objects.

A step 726 may include receiving, by the at least one processor, virtual scene image data corresponding to a virtual scene image.

A step 728 may include, based at least on the pixel mask, blending, by the at least one processor, the virtual scene image and the real scene image to create a mixed reality scene image as mixed reality scene image data.

A step 730 may include outputting, by the at least one processor, the mixed reality scene image data to a display for presentation to a user.

Further, the method may include any of the operations disclosed throughout.

As will be appreciated from the above, embodiments of the inventive concepts disclosed herein may be directed to a method, a system, and at least one head wearable device configured to perform foreground separation by using at least one neural network.

As used throughout and as would be appreciated by those skilled in the art, "at least one non-transitory computer-readable medium" may refer to as at least one non-transitory computer-readable medium (e.g., memory 110, memory 126, memory 206, memory 306, storage 112, storage 128, storage 208, storage 308, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head wearable device, comprising:
a display;
a camera configured to capture a real scene image;
at least one convolutional neural network (CNN) processor communicatively coupled to the camera, the at least one CNN processor being at least one of at least one graphics processing unit (GPU) or at least one field-programmable gate array (FPGA), the at least one CNN processor configured to:
receive real scene image data corresponding to the captured real scene image from the camera;
identify objects in the real scene image;
classify each object of the identified objects as a foreground object or a background object;
generate object classification and position data indicative of classifications and positions of the identified objects; and
output the object classification and position data;
at least one processor communicatively coupled to the camera, the at least one CNN processor, and the display, the at least one processor configured to:
receive the real scene image data corresponding to the captured real scene image from the camera;
receive the object classification and position data from the at least one CNN processor;
based at least on position data of the object classification and position data, perform at least one image segmentation operation on the real scene image to fill in the objects;
generate filled-in object data indicative of the filled-in objects;
based at least on the object classification and position data and the filled-in object data, generate a pixel mask corresponding to foreground objects;
receive virtual scene image data corresponding to a virtual scene image;
based at least on the pixel mask, blend the virtual scene image and the real scene image to create a mixed reality scene image as mixed reality scene image data; and
output the mixed reality scene image data to the display for presentation to a user; and
a head tracking system communicatively coupled to the at least one processor, the head tracking system configured to:
determine a position and an orientation of a head of the user relative to an environment; and
output position and orientation data associated with the determined position and the determined orientation of the head of the user relative to the environment,
wherein the at least one processor is further configured to dynamically switch from a first set of CNN weights to a second set of CNN weights based at least on the position and orientation data from the head tracking system.

2. The head wearable device of claim 1, wherein the at least one CNN processor and the at least one processor are configured to process the real scene image data concurrently.

3. The head wearable device of claim 1, wherein the at least one CNN processor is further configured to provide bounding boxes for the objects, wherein the object classification and position data is further indicative of the provided bounding boxes of the objects.

4. The head wearable device of claim 1, wherein the pixel mask is a blending value pixel mask.

5. The head wearable device of claim 1, further comprising an eye tracking system communicatively coupled to the at least one processor, the eye tracking system configured to perform eye tracking operations of eyes of the user and output eye tracking data, wherein the at least one processor is further configured to dynamically switch from the first set of CNN weights to the second set of CNN weights based at least on the position and orientation data from the head tracking system and on the eye tracking data.

6. The head wearable device of claim 1, wherein the head wearable device is configured to operate in a CNN manual training mode such that the user is able to manually select and classify a particular object as a foreground object or a background object, wherein the at least one processor is configured to generate and output manual object classification information based on a manual selection and classification of the particular object.

7. The head wearable device of claim 1, wherein the camera is configured to utilize a rolling shutter.

8. A method, comprising:
receiving, by at least one convolutional neural network (CNN) processor, real scene image data corresponding to a real scene image from a camera, the at least one CNN processor being at least one of at least one graphics processing unit (GPU) or at least one field-programmable gate array (FPGA);
identifying, by the at least one CNN processor, objects in the real scene image;
classifying, by the at least one CNN processor, each object of the identified objects as a foreground object or a background object;
generating, by the at least one CNN processor, object classification and position data indicative of classifications and positions of the identified objects;
outputting, by the at least one CNN processor, the object classification and position data;
receiving, by at least one processor, the real scene image data corresponding to the real scene image from the camera;
receiving, by the at least one processor, the object classification and position data from the at least one CNN processor;
based at least on position data of the object classification and position data, performing, by the at least one processor, at least one image segmentation operation on the real scene image to fill in the objects;
generating, by the at least one processor, filled-in object data indicative of the filled-in objects;

based at least on the object classification and position data and the filled-in object data, generating, by the at least one processor, a pixel mask corresponding to foreground objects;

receiving, by the at least one processor, virtual scene image data corresponding to a virtual scene image;

based at least on the pixel mask, blending, by the at least one processor, the virtual scene image and the real scene image to create a mixed reality scene image as mixed reality scene image data;

outputting, by the at least one processor, the mixed reality scene image data to a display for presentation to a user; and dynamically switching, by the at least one processor, from a first set of CNN weights to a second set of CNN weights based at least on position and orientation data from a head tracking system, the position and orientation data associated with a determined position and a determined orientation of a head of the user relative to an environment.

9. The method of claim 8, wherein the at least one CNN processor and the at least one processor are implemented in a head wearable device.

10. The method of claim 8, wherein the at least one CNN processor and the at least one processor process the real scene image data concurrently.

11. The method of claim 8, wherein the object classification and position data is further indicative of bounding boxes of the objects.

12. The method of claim 8, wherein the pixel mask is a blending value pixel mask.

13. The method of claim 8, further comprising:
detecting motion of an object of the identified objects;
based at least on detected motion of the object, classifying, by the at least one CNN processor, the object as a foreground object.

14. The method of claim 8, further comprising:
operating, by a head wearable device including the at least one CNN processor and the at least one processor, in a CNN manual training mode such that the user is able to manually select and classify a particular object as a foreground object or a background object.

15. The method of claim 8, wherein the real scene image is a real scene image sub-frame.

16. A system, comprising:
a display;
a camera configured to capture a real scene image;
at least one convolutional neural network (CNN) processor communicatively coupled to the camera, the at least one CNN processor being at least one of at least one graphics processing unit (GPU) or at least one field-programmable gate array (FPGA), the at least one CNN processor configured to:
receive real scene image data corresponding to the captured real scene image from the camera;
identify objects in the real scene image;
classify each object of the identified objects as a foreground object or a background object;
generate object classification and position data indicative of classifications and positions of the identified objects; and
output the object classification and position data;
at least one processor communicatively coupled to the camera, the at least one CNN processor, and the display, the at least one processor configured to:
receive the real scene image data corresponding to the captured real scene image from the camera;
receive the object classification and position data from the at least one CNN processor;
based at least on position data of the object classification and position data, perform at least one image segmentation operation on the real scene image to fill in the objects;
generate filled-in object data indicative of the filled-in objects;
based at least on the object classification and position data and the filled-in object data, generate a pixel mask corresponding to foreground objects;
receive virtual scene image data corresponding to a virtual scene image;
based at least on the pixel mask, blend the virtual scene image and the real scene image to create a mixed reality scene image as mixed reality scene image data; and
output the mixed reality scene image data to the display for presentation to a user; and
a head tracking system communicatively coupled to the at least one processor, the head tracking system configured to:
determine a position and an orientation of a head of the user relative to an environment; and
output position and orientation data associated with the determined position and the determined orientation of the head of the user relative to the environment,
wherein the at least one processor is further configured to dynamically switch from a first set of CNN weights to a second set of CNN weights based at least on the position and orientation data from the head tracking system.

17. The system of claim 16, further comprising a computing device comprising a processor, wherein the computing device is configured to generate the virtual scene image data and output the virtual scene image data to the at least one processor.

18. The system of claim 16, further comprising a computing device comprising a processor, wherein the head wearable device is communicatively coupled to the computing device via a network.

* * * * *